Dec. 19, 1939.  J H. S. PARKER ET AL  2,184,003
FILM CONTROL MEMBER FOR A FILM MAGAZINE
Filed March 3, 1938
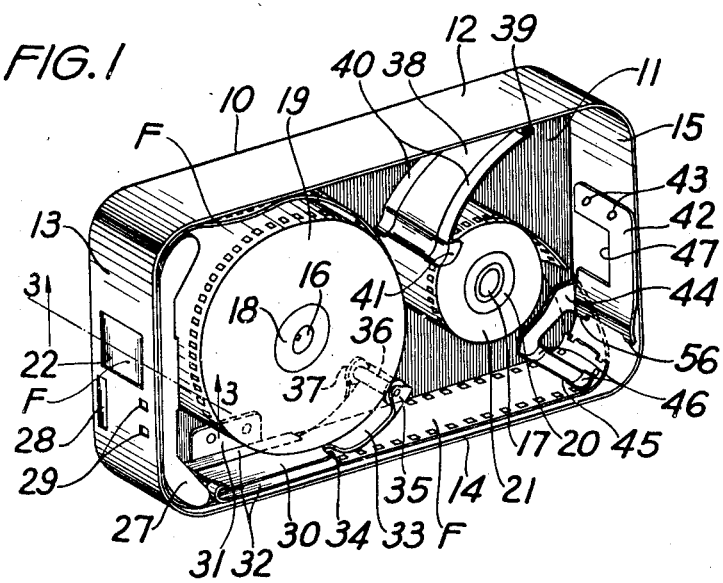
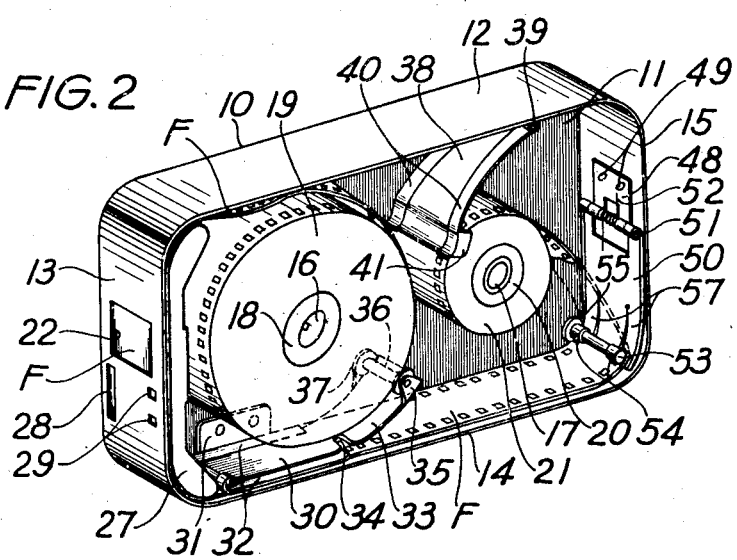
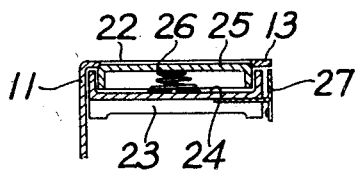
J Henry S. Parker
Donald H. Stewart
INVENTORS
BY Newton M. Perrins
George A. Gillett, Jr.
ATTORNEYS Patented Dec. 19, 1939

2,184,003

UNITED STATES PATENT OFFICE 2,184,003

FILM CONTROL MEMBER FOR A FILM MAGAZINE

J Henry S. Parker and Donald H. Stewart, Rochester, N. Y., assignors to Eastman Kodak Company, Rochester, N. Y., a corporation of New Jersey Application March 3, 1938, Serial No. 193,696

8 Claims. (Cl. 88—17)

The present invention relates to film control members for a film magazine and more particularly to a film tension control member mounted upon the rear wall of the magazine casing.

Film tension control members for use in motion picture apparatus without a free film loop are comparatively well known both in standard types of apparatus and in or on magazines for the magazine type of apparatus. Compact design of a film magazine containing one or more film tension control members is difficult because of the limited space available for the provision and movement of the film tensioning member. Several of the known locations for the film tensioning member, such as on the top or bottom wall of the magazine casing, are objectionable because the supports for the spring tensioning members often mark or scratch the film surface.

The primary object of the present invention is the provision of a film tension member for a film magazine and which is mounted upon the rear edge wall of the magazine casing.

A further object of the invention is the provision of a film tension member mounted upon one of the edge walls of the magazine casing so that the film engaging portion of the tensioning member is at all times substantially parallel to the film and edge walls.

Another object of the invention is the provision of a combined guide and retaining member constituting a film channel leading from one end of the film gate in the magazine and resiliently supporting a retaining roller which bears against the outer convolution of the supply film roll.

Other details and objects of the invention will be apparent or suggested to those skilled in the art by the disclosure which follows.

The aforementioned objects of the invention are embodied in a film magazine enclosed by a casing having a side wall and top, bottom, front and rear edge walls. The film magazine of the invention is also provided with a film gate along the front edge wall, with a supply film roll mounted forwardly within the casing and a take up film roll mounted rearwardly within the casing. A combined guide member and retaining member forms a film channel leading from the lower end of the film gate and has a resilient portion carrying a retaining member which is pressed against the supply film roll. Finally, the film tension control within the magazine is obtained with a resilient member having a body portion which is mounted upon the rear edge wall of the magazine casing and including a film engaging portion in contact with the film extending from the film gate to the take-up roll and maintaining a proper tension in such film.

Reference is hereby made to the accompanying drawing wherein similar reference characters designate similar elements and wherein:

Fig. 1 is a perspective view of a film magazine with cover removed and illustrating the film control members of the invention, Fig. 2 is also a side perspective of an open film magazine and illustrates a modified form of the film tension control member mounted on the rear edge wall of the magazine casing, Fig. 3 is a fragmentary, transverse cross section through the film gate of the magazine and taken on the line 3—3 of Fig. 1.

In the illustrated embodiments of our invention, the film magazine comprises a magazine casing 10 having a side wall 11 and a top edge wall 12, a front edge wall 13, a bottom edge wall 14 and a rear edge wall 15.

Spindles 16 and 17 are mounted in a known manner upon the side wall 11 of the magazine casing. The spindle 16 may be fixed and supports a film core 18 on which the supply film roll 19 is wound. The take-up spindle 17 is rotatably mounted and is rotated in a known manner within the magazine casing 10 and carries with it a film core 20 on which the take up film roll 21 is wound.

The film gate may be provided by an exposure opening 22 in the front edge wall 13 and including a backing member mounted within the film magazine and comprising, see Fig. 3, a back support 23 having a recess 24 in which a pressure pad 25 may move. The film F extends from the supply film roll 19 through the film gate, being supported across the exposure opening 22 by the pressure pad 25 which is pressed by spring 26 toward said exposure opening 22. The side guide 27 is mounted upon the back support 23 and eliminates side weave of the film during its movement through the film gate. The front edge wall 13 is also provided with an elongated slot 28 through which the film advancing mechanism of the associated apparatus may engage and move the film F and is also provided with holes 29 through which a positioning means of the associated apparatus may engage the film perforations.

The film, in its path from the film gate to the take-up, passes the supply film roll 19 and unless proper precautions are taken, this film leaving the gate may become tangled with said supply film roll 19. The precaution contemplated by the present invention is the provision of a combined guide member and retaining member which conducts the film safely past the supply film roll and which also has a retaining member engaging said film roll to prevent clock-springing thereof. Said member comprises a stationary guide 30 mounted by a flange 31 on the side wall 11 in spaced relation to the bottom edge wall 14 to form a film channel and having embossed film engaging margins 32. Said guide 30 carries a resilient portion 33 rendered more flexible by an intervening notch 34 and having a pair of ears 35 between which the retaining member or roller 36 with flanges 37 is journalled. Resilient portion 33 presses the flanges 37 of the retaining member against the outer convolution of supply film roll 19 so that the natural resiliency of the film will not produce premature uncoiling of supply film roll 19.

The film F extends from the film guide channel just described around the film engaging portion of a film tensioning member to the take-up film roll 21. Even lateral winding of the film on said take-up film roll 21 is insured by a guide member 38 hinged at 39 to the top edge wall 12, having embossed film engaging margins 40 and having a pair of lateral projections 41 for engaging the opposite edges of the film F as it is wound onto take-up film roll 21. The film tension control member is mounted on the rear edge wall 15 of the magazine casing 10 according to the present invention and may be provided in either of two forms, the preferred form being illustrated in Fig. 1 and a modified form being shown in Fig. 2.

The preferred form of the film tension control member comprises a body portion 42 secured by rivets 43 at its upper end to the rear edge wall 15, a lateral flange 44 which is parallel and adjacent to the side wall 11, and a curved film engaging portion 45 connected at its inner end to the lateral flange 44 and provided with embossed film engaging margins 46. Film engaging portion 45 is supported by lateral flange 44 in spaced relation to the lower or free end of body portion 42 so that the film F may be readily threaded around said film engaging portion 45. Since said film engaging portion 45 is supported from only one end on lateral flange 44, there will be a tendency for said film engaging portion 45 to be inclined with respect to the film upon flexing of the body portion 42 and the film will build up unevenly on the take-up film roll 21. Such tendencies may be eliminated, however, by providing a recess 47 in body portion 42 along the inner edge thereof adjacent to side wall 11. Such recess 47 permits lateral flexing of the body portion 42 to compensate for the lateral flexing in the opposite direction of the film engaging portion 45 with respect to lateral flange 44.

The modified form of the film tensioning member comprises a bracket 48 secured by rivets 49 to rear edge wall 15, a body portion 50 connected by a hinge 51 to bracket 48 and biased toward said rear edge wall 15 by a spring 52. The film engaging portion comprises a roller or post 53 having enlarged ends 54 for engaging the margins of the film F and is mounted on a lateral flange 55 connected to said body portion 50.

Either type of film tension member will give very satisfactory tension control of the film engaging and extending around the film engaging portion of said members. As the film is advanced toward the rear of the magazine, it may, under some conditions, move against the lower or free end of the body portions. In order to prevent scratching of the film under such infrequent condition, the body portion 42 is provided with a pair of projections 56 and the body portion 50 is provided with a pair of embossed film engaging margins 57.

Since detailed variations of the guiding and retaining member or the film tensioning members illustrated herein may be accomplished without departing from the scope of the invention, the present disclosure is to be construed in an illustrative sense and the invention itself is defined by the appended claims.

Having now particularly described our invention what we desire to secure by Letters Patent of the United States and what we claim is:

1. In a film magazine, the combination with an elongated casing having a side wall and a top, bottom, front, and rear edge walls, said top and bottom walls being longer than said front and rear walls, a film gate including a backing member for supporting the film across an exposure opening in the front edge wall of said casing, a supply core and film roll mounted in the forward portion of said casing, and a take-up core rotatably mounted in the rearward portion of said casing, of a combined guide member and retaining member having a stationary portion forming with said bottom edge wall a film channel which extends from one end of said film gate and having a resilient portion carrying said retaining member which is resiliently pressed against the outer convolution of said supply film roll, and a resilient member mounted upon the rear edge wall of said casing, having a film engaging portion in the lower rear portion of said casing and for controlling the tension in the film which extends from said film gate to said take-up core.

2. In a film magazine, the combination with a casing having a side wall and top, bottom, front, and rear edge walls, a film gate including a backing member for supporting the film across an exposure opening in the front edge wall of said casing, and a film take-up roll rotatably mounted in the rear portion of said casing, of a film engaging portion located beyond said film roll on the opposite side of said film gate for contacting the film strip at the apex of the acute angle path formed by the film in its passage from said film gate to said take-up roll, and a support for said film engaging portion mounted in said magazine and which resiliently urges said film engaging portion to exert more effort longitudinally of the film extending from said film gate than along the film tangential to said take-up roll.

3. In a film magazine, the combination with a casing having a side wall and top, bottom, front, and rear edge walls, a film gate including a backing member for supporting the film across an exposure opening in the front edge wall of said casing, and a film takeup core rotatably mounted in the rearward portion of said casing, of a film engaging member for contacting one surface of the film in its path from the film gate to said takeup core, a body portion resiliently mounted on said rear edge wall and on the other side of the film, and a lateral portion adjacent said side wall and connected between one end of said film engaging member and said body portion.

4. In a film magazine, the combination with a casing having a side wall and top, bottom, front, and rear edge walls, a film gate including a pressure member for supporting the film across an exposure opening in the front edge wall of said casing, and a film takeup core rotatably mounted in the rearward portion of said casing, of a leaf spring film tensioning member secured to one of said edge walls, comprising a body portion provided with a recess adjacent to said side wall, a lateral flange parallel and adjacent to said side wall, and a curved film engaging portion connected at its inner end to said flange but spaced from the free end of said body portion.

5. In a film magazine, the combination with a casing having a side wall and top, bottom, front, and rear edge walls, a film gate including a backing member for supporting the film across an exposure opening in the front edge wall of said casing, and a film takeup core rotatably mounted in the rearward portion of said casing, of a leaf spring film tensioning member secured to one of said edge walls, comprising a body portion provided with a recess adjacent to said side wall, a lateral flange parallel and adjacent to said side wall, an arcuate film engaging portion connected at its inner end to said flange but spaced from the free end of said body portion, and marginal ridges on said film engaging portion and the adjacent free end of said body portion.

6. In a film magazine, the combination with a casing having a side wall and top, bottom, front, and rear edge walls, a film gate including a backing member for supporting the film across an exposure opening in the front edge wall of said casing, and a film takeup core rotatably mounted in the rearward portion of said casing, of a film tensioning assembly comprising a bracket mounted on the rear edge wall of said casing, a flat arm hinged to said bracket for movement about an axis parallel to said edge wall and including a lateral flange parallel and adjacent to said side wall, a cylindrical film engaging portion mounted from one end on said lateral flange and around which the film extends in its path from the film gate to the takeup core, and a resilient member acting upon said arm to move the same toward said rear edge wall and providing tension control for the film.

7. In a film magazine, the combination with an elongated casing having a side wall and top, bottom, front, and rear edge walls, said top and bottom walls being longer than said front and rear edge walls, a film gate including a backing member for supporting the film across an exposure opening in the front edge wall of said casing, a supply core and film roll mounted in the forward portion of said casing, and a takeup core rotatably mounted in the rearward portion of said casing, of a combined guide member and retaining member having a stationary portion forming with said bottom edge wall a film channel which extends from one end of said film gate, and having a resilient portion carrying said retaining member which is resiliently pressed against the outer convolution of said supply film roll.

8. In a film magazine, the combination with a casing having a side wall and top, bottom, front, and rear edge walls, a film gate for supporting the film across an exposure opening in the front edge wall of said casing, and a supply core and film roll mounted in the forward portion of said casing, of a combined guide member and retaining member, having a stationary portion forming with said bottom edge wall a film channel which extends from one end of said film gate, having a resilient portion carrying said retaining member which is resiliently pressed against the outer convolution of said supply film roll, and being provided with a lateral notch between said stationary portion and said resilient portion.

J HENRY S. PARKER.
DONALD H. STEWART.